United States Patent [19]

Becht, IV

[11] Patent Number: 4,532,108
[45] Date of Patent: Jul. 30, 1985

[54] REFRACTORY GAS DISTRIBUTOR FOR FLUIDIZED BED REACTORS

[75] Inventor: Charles Becht, IV, Morristown, N.J.

[73] Assignee: Exxon Research and Engineering Co., Florham Park, N.J.

[21] Appl. No.: 527,113

[22] Filed: Aug. 29, 1983

[51] Int. Cl.³ .......................... B01J 8/44; F27B 15/10
[52] U.S. Cl. .................... 422/143; 422/311; 431/7; 431/170; 432/15; 432/58
[58] Field of Search ............... 422/143, 311; 431/7, 431/170; 432/15, 58; 48/202

[56] References Cited

U.S. PATENT DOCUMENTS

| | | | |
|---|---|---|---|
| 3,545,939 | 12/1970 | Cox et al. | 422/311 X |
| 3,746,516 | 7/1973 | Michand | 432/58 X |
| 3,782,903 | 1/1974 | Kramer | 422/311 X |
| 3,863,359 | 2/1975 | Grega | 34/57 R |
| 3,910,755 | 10/1975 | Syska | 432/15 X |
| 4,159,305 | 6/1979 | Moorey | 422/143 |
| 4,213,938 | 7/1980 | Pyzel | 422/143 |
| 4,226,830 | 10/1980 | Davis | 422/143 |
| 4,317,798 | 3/1982 | Worley | 422/143 X |

FOREIGN PATENT DOCUMENTS

| | | | |
|---|---|---|---|
| 2020406 | 11/1979 | United Kingdom | 432/58 |
| 578546 | 11/1977 | U.S.S.R. | 432/58 |

Primary Examiner—Barry S. Richman
Assistant Examiner—William R. Johnson
Attorney, Agent, or Firm—Donald F. Wohlers

[57] ABSTRACT

In all refractory gas distributor is used to distribute fluidization gas to a fluidized bed reactor. The distributor slabs contain cast-in gas passages which distribute the gas to uniformly distributed grid holes to the surface. The slabs are continuously supported by a bed of refractory filling the bottom head of said reactor vessel and pressure equalization passages are provided to place the lower surface of the grid plate in fluid communication with the upper surface of the grid plate.

8 Claims, 6 Drawing Figures

REFRACTORY GAS DISTRIBUTOR FOR FLUIDIZED BED REACTORS

BACKGROUND OF THE INVENTION

In the petroleum process industry, it is common to use a fluidized bed reactor wherein solids are contacted with gases to promote chemical and physical reactions between the solids suspended in the gas and the gas passing therethrough. Fluidized bed reactors are typically used in catalytic cracking processes, petroleum coking and gasification processes and are contemplated for use in processes for the gasification of pulverized coal into low and medium BTU synthesis gas.

Typically, such fluidized bed reactors include a lower grid plate with a plurality of gas passageways therethrough to support the bed. Below such grid plate, it is conventional to have a plenum or wind box wherein the bed suspending gas is introduced under pressure to exit upwardly through the orifices in the grid plate to suspend the bed thereabove in a fluidized state. Unfortunately, as the reaction temperatures within the bed and the temperature of the fluidizing gas increases, the structural integrity of any metal grid used to support the bed is diminished and becomes the limiting factor on the upper temperature limit at which the process reaction may occur. An appreciation of these constraints in fluidized bed reactors may be obtained by reference to U.S. Pat. Nos. 4,226,830 and 4,159,305, whose disclosures are incorporated herein by reference for background. While in the latter patent an all ceramic material fluidized bed grid plate is contemplated, the substitution of the ceramic material therein for a prior art metallic grid does not eliminate the windbox pressure differential therebelow and therefore the structural forces created by the pressure differential in the windbox of U.S. Pat. No. 4,159,305 will greatly limit the operating temperature and pressure parameters of the fluid bed thereabove.

SUMMARY OF THE INVENTION

With the foregoing handicaps of both metallic prior art grid structures as well as refractory grid structures for use in fluidized beds in mind, the present invention is directed to a new and unique refractory gas distributor, herein designated as a refractory grid design and support therefor which may readily be cast in stages from refractory ceramic material. Many different variations of the new, improved design are possible, but in each instance the refractory grid or distributor slab is continuously supported across the width of the reactor by a cast mass of refractory filling the bottom head portion of the reactor shell. This support for the reactor grid is continuous along its lower surface so that stresses due to weight are negligably small in the grid structure itself. Furthermore, since there is no conventional windbox beneath the grid, the stresses due to pressure uplift that would otherwise be present are eliminated. In the designs contemplated, should a crack occur in the cast refractory grid, the grid will still perform satisfactorily. Because the cast refractory grid is preferably reinforced with metal fiber, formation of cracks should be substantially reduced, even during medium stress conditions. Therefore, in accordance with the invention, a non-metallic gas distributor grid means is provided which extends across substantially the entire width of a lower portion of the reactor to define a bottom head space therebelow which is filled with a further castable refractory support means for the grid. In one form of the invention, the distributor grid includes a plurality of concentric spaced annular passageways communicating with a plurality of interconnecting radial spoke passageways, all of which are connected to a central gas inlet conduit means extending upwardly through the grid support means. Each of the radial spoke and concentric passageways are provided with a plurality of upwardly disposed gas outlet passages which are uniformly distributed over the diameter of the grid to evenly distribute the fluidizing bed gases across the reactor cross section.

In another form of the invention, the reactor grid is made up of a plurality of individually cast independent refractory ceramic grid sections, each of which has a central manifold passageway and a plurality of outlet passageways extending from the manifold passageway to the upper surface of each grid section. In turn, each grid section is supported by a mass of castable refractory material substantially filling the bottom head portion of the reactor shell. In construction, each of these grid arrangements in the foregoing two mentioned embodiments of the invention are fabricated in stages wherein first the cast refractory support is poured within the reactor shell and thereafter, upon setting, the reactor grid slab is sequentially cast in place thereabove. During such casting, portions of the grid slab are integrally keyed or locked to portions of the grid support therebelow, while other contacting surfaces are separated during the casting process by a sheet of plastic film so that upon subsequent operation of the reactor relative motion between the adjacent parts due to differential thermal expansion may occur.

Accordingly, it is a principle object of this invention to provide a new and improved reactor grid and support therefor which is made of castable refractory material.

Another object of the invention is to provide a new and improved refractory grid design for a fluidized bed reactor in which substantially no pressure drop will occur across the grid to substantially eliminate all upward stress thereon.

Another object of the invention is to provide a continuous support for a refractory grid in a fluidized bed reactor.

Another object of the invention is to provide a refractory grid design which is neither pressure nor diameter limited and capable of high temperature operation.

A still further object of the invention is to provide an improved reactor grid design which is easy to construct, rugged in performance and economical to manufacture.

These and other objects of the invention are pointed out with particularity in the following specification and drawings in which:

DETAILED DESCRIPTION OF THE INVENTION

Figure 1:
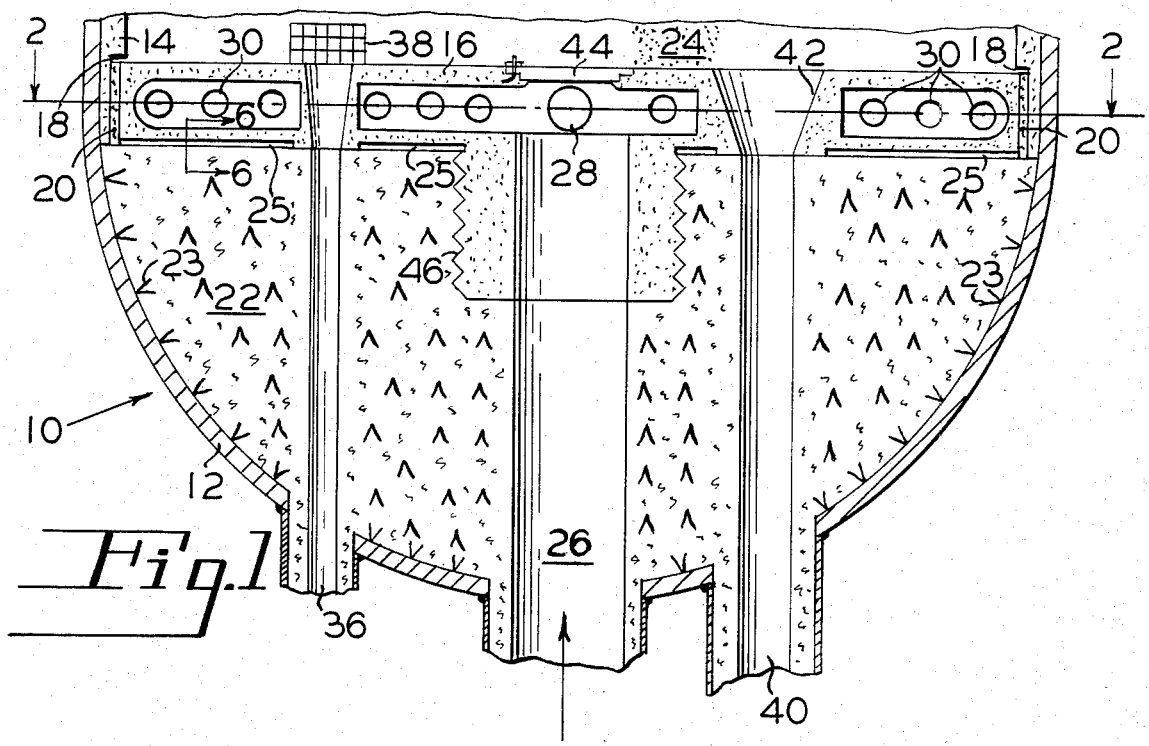
FIG. 1 is a partial vertical section (along line 1—1 of FIG. 2) of a lower portion of a fluidized bed reactor showing the distributor grid and support therefor in accordance with one embodiment of the invention.

Referring to the embodiment shown in FIGS. 1 through 3 and FIG. 6, a lower portion 10 of a generally cylindrical fluidized bed reactor includes an outer metallic shell 12 and an inner refractory lining 14. Extending radially across the lower head portion of the reactor shell 12 is an all-refractory distributor slab or grid 16 whose outer periphery extends into a notched portion 18 formed in the refractory 14. A peripheral gap between the outside diameter of the distributor grid 16 and the refractory 14 is suitably packed with a ceramic fiber insulation material 20 such as Kaowool. The gap 18 and Kaowool 20 in such gap about the grid periphery accommodates any minor differential thermal expansion and change in dimension (e.g. due to shrinkage) between the reactor shell and the grid diameter. The grid is continuously supported along its undersurface by a mass of castable refractory material 22 filling the entire bottom head section of the reactor shell 12. The bottom surface of the reactor grid 16 is integrally engaged with the refractory 22 through the provision of suitable corrugations 46 which are formed in the castable material 22 prior to the subsequent casting on top thereof of the refractory grid 16. At the same time that the upper grid assembly 16 is cast against the previously cast support surface of the mass 22, a plurality of radial weep passages 25 are formed in the lower surface of the slab 16 (see FIG. 6) that connect to gap 18 and thus to the fluidized bed 24 above slab 16. Thus, the surface beneath slab 16 will be at the same pressure as the fluidized bed 24 above the grid slab 16 and there will be no conventional windbox uplift. Typically, these weep passageways 25 may be formed by a sectioned length of plastic pipe, cardboard core, or other means during the casting process in combination with a plastic sheet disposed on top of support mass 22 to prevent any mechanical bonding therebetween during the casting operation except for those areas of 22 previously provided with the corrugations 46. Those skilled in the art will understand that the plastic semi-circular pipe used as a coring means to form the weep passages 25 will readily disintegrate by vaporization during the first heat up of the ceramic during dryout to leave the void weep passageways 25. Similar castable refractory coring inserts made of plastic pipe, cardboard pipe, or other means may be employed throughout the grid structure 16 for forming the various other passageways therein. The castable refractory mass 22 may be suitably anchored and secured to the inner surface of the shell 12 by the provision of conventional anchor members 23.

Figure 2:
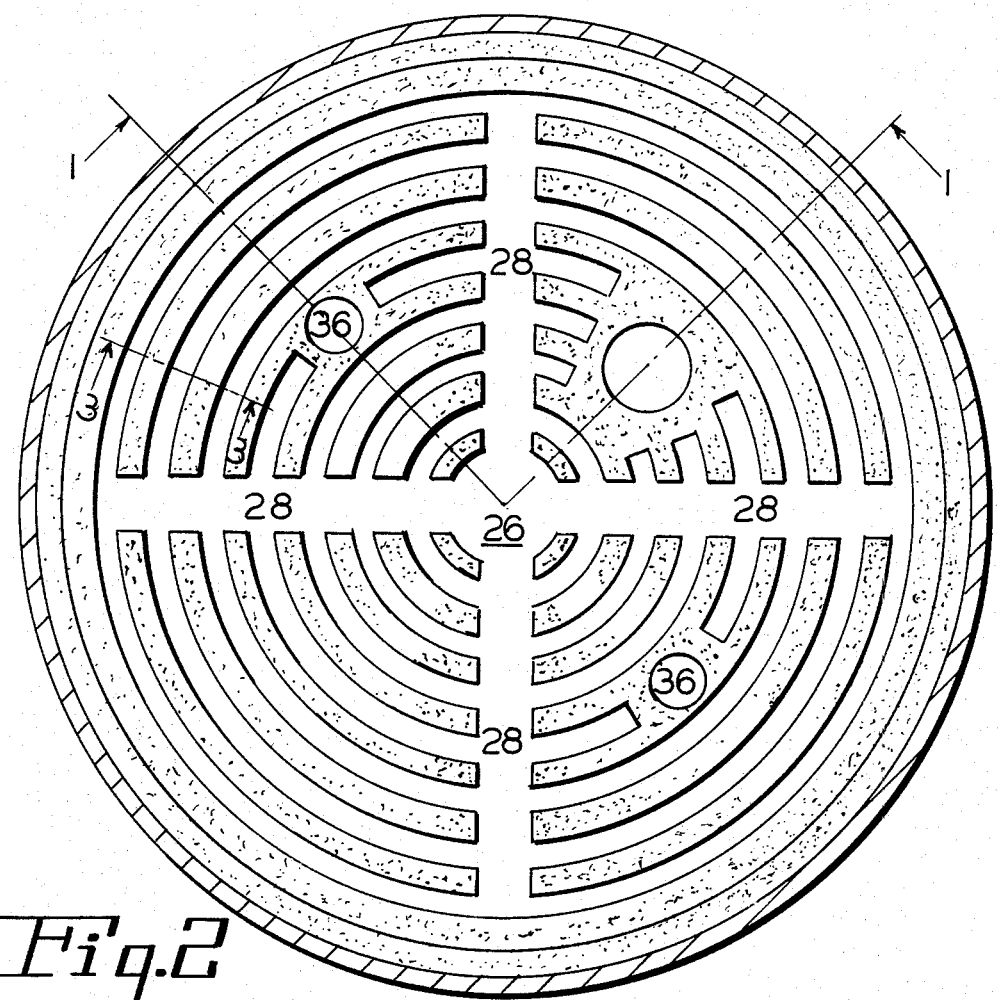
FIG. 2 is a horizontal cross-section taken along line 2—2 of FIG. 1.
Figure 6:
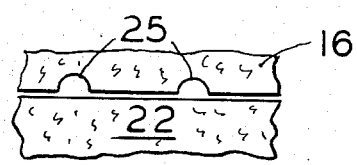
FIG. 6 is a fragmentary cross-sectional view taken along line 6—6 of FIG. 1, looking in the direction of the arrows.
Figure 3:
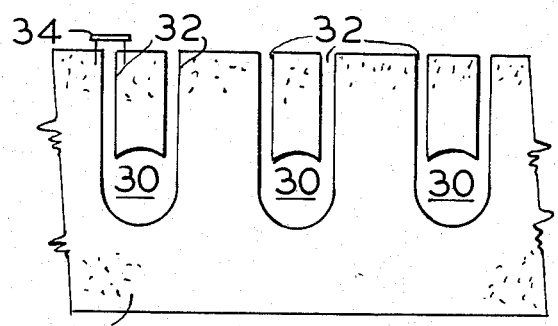
FIG. 3 is a fragmentary cross-sectional view taken along line 3—3 of FIG. 2.

Referring to FIGS. 1 and 2 in particular, the pattern of the fluidizing gas passageways may be seen wherein a plurality of radial spoke passages 28 feed a plurality of interconnected circumferential passageways 30. Each of these passageways 28 and 30 communicate with a plurality of upward extending gas outlet passages 32 (see FIG. 3) which function to distribute gas under pressure upwardly across the entire diameter of the distributor grid to fluidize the bed thereabove in the reactor for the process taking place therein. As is conventional in such fluidized bed distributor grids suitable anti-backflowing devices or caps 34 may be provided over the outlet ends of each passage 32 to prevent blockage of such passageways during a slumped or upset condition in the bed. The upper surface of the distributor plate 16 may also be provided with one or more removable covers or access doors 44 to permit inspection and cleaning of the internal passages 28 and 30, if required. Disposed essentially along the axis of the lower portion of the reactor shell 12 is a gas inlet conduit 26 which communicates upwardly with the inner ends of the spoke passageways 26. Typically in the operating environment contemplated for the present high temperature gas distributor grid, the inlet gases flowing upwardly in conduit 26 could be a mixture of steam under pressure along with a portion of low or medium BTU synthesis gas produced in the reactor which would gasify pulverized coal in the fluid bed above the distributor plate. The process conditions contemplated for the production of synthesis gas in a coal gasification process might contemplate the introduction of fluidizing gases in the temperature range of 1452°–1660° F., with a bed design temperature of 1325° F., all of which are elevated temperatures at which a stainless steel metallic grid or other metal would be operating near to its temperature limits.

In the presently contemplated use, the upper surface of the grid 16 is also provided with a screen 38 disposed over a char withdrawal passage 36, extending downwardly therethrough and exiting through the reactor shell 12 therebelow. A similar chunk char withdrawal passageway 40 without the need for a uppermost screen is also provided. The passageway 40 includes an upper conical funnel section 42 therein to facilitate entrance of large pieces of char that may build up on the grid after prolonged operation of the reaction process. Similar means of withdrawing and/or feeding substances to the bed can be made through the refractory passageway 40 as required for other processes.

Figure 4:
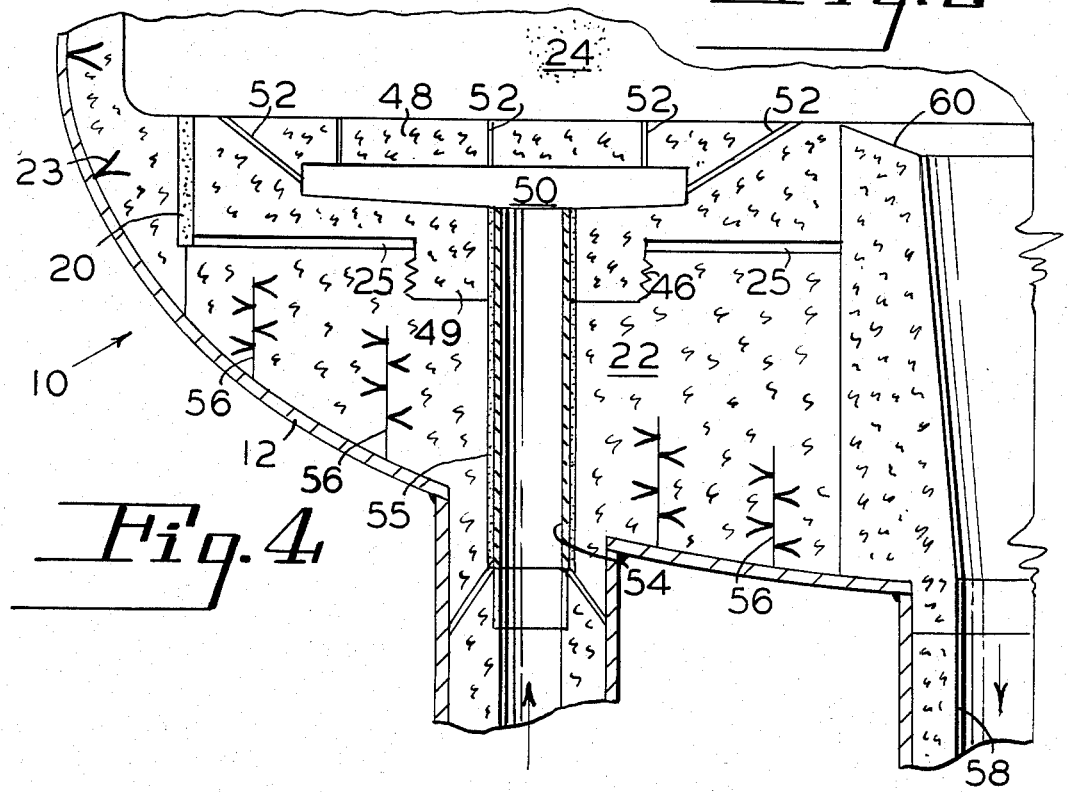
FIG. 4 is a view similar to FIG. 1 showing an alternate embodiment of the invention.
Figure 5:
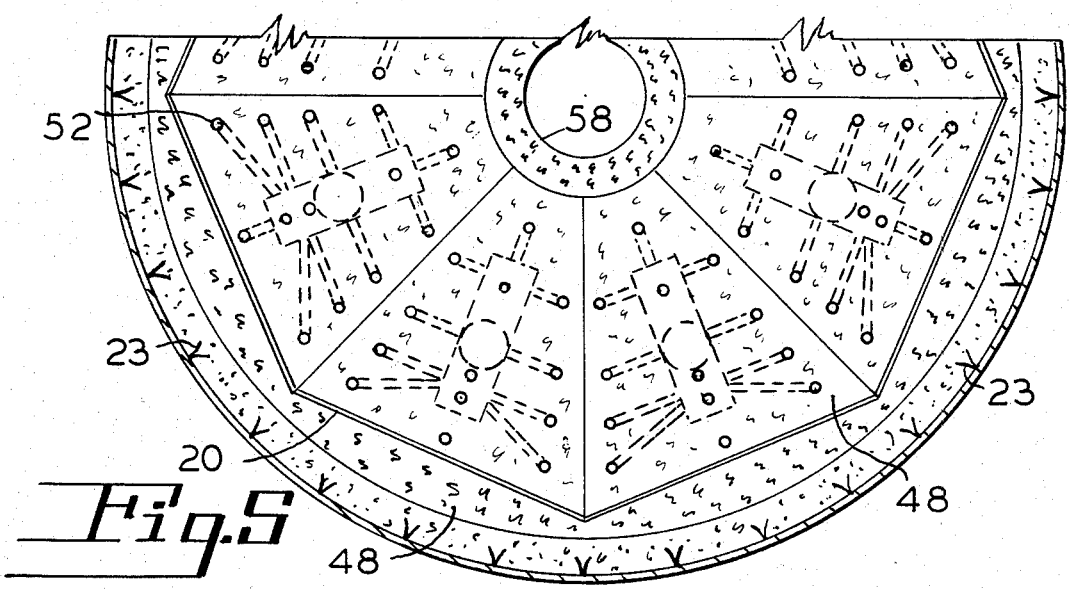
FIG. 5 is a fragmentary horizontal cross-section of the embodiment of FIG. 4.

An alternate embodiment of the invention is shown in FIGS. 4 and 5 wherein similar reference designations refer to similar parts in each of the two embodiments illustrated. In the FIGS. 4 and 5 embodiment, the grid distributor plate is formed from a plurality of grid sectors 48. Each of the grid sectors 48 includes a lower boss portion 49 surrounding its respective gas inlet conduit 54, said boss including complementary corrugations 46 for the mechanical bonding of the cast grid sector 48 to the previously cast lower supporting material 22 in the bottom head of the reactor shell 12. The metallic conduit 54 is preferably backed with a ceramic fiber blanket 55 to provide for differential thermal expansion between conduit 54 and the refractory mass 22. Each of the grid sectors 48 includes a manifold passageway 50 disposed in a generally radial direction in communication with the gas inlet 54. A plurality of upwardly disposed distributor outlet tubes 52 communicate with the manifold passageway 50. In this embodiment, the grid support mass 22 is suitably anchored to the reactor shell 12 by a plurality of anchor trees 56 or other conventional anchors weldably secured to the inner surface of the shell 12. Disposed along the central axis of the reactor is a char withdrawal passageway 58 having an upper conical funnel entrance opening 60. To facilitate flow of materials to the funnel area 60, the upper surface of the grid 48 may be downwardly sloped toward the center, if desired.

As may be seen from the top view of the grid in FIG. 5, each of the grid sections 48 is independent of one another and may be provided along its outer edge with an expansion gap between it and the main reactor insulation which may also be filled with a ceramic fiber blanket 20 which acts as an expansion joint but is yet sufficiently porous to allow pressure equalization between the upper and lower surface of the grid sections 48. If desired, such ceramic fiber blanket 20 may also be provided along the radial partition joints between each of the contiguous and adjacent sectors 48. In any event, those skilled in the art will appreciate that in the construction of the refractory grid assembly shown in FIGS. 4 and 5 that initially the mass 22 is cast within the bottom shell of the reactor employing suitable forms to produce a monolithic or segmented foundation for the subsequent casting of each of the individual sectors 48. Any forms or cores used for the first pour of the support medium 22 will be of the desired shape to provide the corrugations 46 in the mass 22 so that upon subsequent casting of each of the individual sectors 48, a companion corrugation will be formed therein to interlock with the previously cast support mass 22. Furthermore, as in the FIG. 1 embodiment of the invention, the bottom surfaces of grid sectors 48 are provided with a plurality of weep passageways 25 which communicate with the expansion gaps around the sectors 48 and thus to the fluidized bed 24. The passageways 25 may be formed in the same fashion as described with respect to FIG. 1. While the mass 22 and the grid slab have been shown as segmented castings, they may each be made in monolithic pours if desired.

In operation, applicant's invention of an all ceramic grid, either of unitary construction or multiple sector construction, which is continuously supported along its lower surface, will produce a grid structure capable of extreme and almost unlimited high temperature operation. While the use of ceramic or refractory grids may have been employed in the past, such as, for instance, shown in U.S. Pat. No. 3,863,359, or U.S. Pat. No. 4,159,305, these refractory grid arrangements were little more than direct structural analogies of prior art metallic grids, and were therefore subject to all of the stresses due to uplift experienced by each metallic grid. In refractory arch construction, such as in U.S. Pat. No. 3,863,359, the arches do not withstand uplift forces by structural means and thus the weight of the refractory is used to balance the uplift. As a result, the windbox or uplift pressure is generally limited to less than one to two pounds per square inch which is insufficient for many fluid bed processes. U.S. Pat. No. 4,159,305 relies on the structural strength of the refractory to withstand the entire loading thereon created by the differential pressure in the windbox and the fluidized bed pressure thereabove. Because refractory materials generally have very poor strength in tension (and thus bending), this type of windbox distributor grid construction is also limited to low differential pressures. In contrast, applicant's arrangement essentially eliminates the pressure differential across the distributor grid and continuously supports the weight of the distributor and bed along the bottom surface thereof by a mass of castable refractory filling the entire bottom head of the reactor. In applicant's arrangement, by providing a plurality of one or more inlet gas passageways which supply gas under pressure to a pattern of internal passageways within the cast grid, essentially no structural loading is placed upon the grid by virtue of the pressure differential as is obviously the case in the aforedescribed windbox arrangements extending completely below the refractory grids of the prior art. Applicant's provision of communication and expansion passageways about and below his grid slab also have the effect of substantially equalizing the pressure across the slab and minimizing the structural stress thereon.

With the foregoing in mind, those skilled in the art will readily appreciate the many advantages of the present design since it will produce a grid distributor plate which is not temperature sensitive, and avoids the use of costly high temperature resistant metals and permits reactor operation at elevated temperatures and high differential pressures heretofore not possible in a metallic grid environment.

While specific embodiments of the invention have been shown and described in detail to illustrate the application of the inventive principles, it will be understood that the invention may be embodied otherwise without departing from such principles.

What is claimed is:

1. A non-metallic gas distributor grid for a high temperature fluidized bed reactor comprising a generally circular cast refractory ceramic grid plate extending across substantially the entire width of a lower portion of the reactor to define a bottom head space therebelow, said grid plate including a plurality of concentric spaced annular passageways communicating with a plurality of interconnecting radial spoke passageways and a plurality of upwardly disposed gas outlet passages communicating with said annular and spoke passageways, all of said passageways and said passages being integrally formed in said grid plate during casting thereof, a grid support comprising a mass of castable refractory substantially filling said bottom head space and having an upper surface in supporting surface contact with a lower surface of said grid plate, means integrally joining a portion of the lower surface of said grid plate with said grid support, means defining a plurality of pressure equilization passageways, between the lower surface of said grid plate and the upper surface of said grid support, extending radially outward to the periphery of said grid plate, whereby said pressure equalization passageways are in fluid communication with an upper surface of said grid plate, and a central gas inlet conduit means extending upwardly through said grid support intersecting said radial spoke passageways, whereby the gas pressure drop across the grid plate required for bed fluidization is substantially eliminated and the lower surface of said grid plate is substantially continuously supported by said grid support across the reactor diameter.

2. The combination of claim 1 including first and second solids removal passageways extending upwardly through said grid support and said grid plate each communicating with the upper surface of said grid plate, said first removal passageway including screen means for limiting the size of particles removed therethrough.

3. The combination of claim 1 including at least one passageway extending upwardly through said grid support and said grid plate communicating with the upper surface of said grid plate.

4. The combination of claim 3 wherein the joining of the grid plate includes corrugation surrounding the central gas inlet conduit means castably interlocking with corresponding corrugations in said grid plate.

5. A non-metallic gas distributor grid for a high temperature fluidized bed reactor comprising a generally circular refractory ceramic grid plate means extending across substantially the entire width of a lower portion of the reactor to define a bottom head space therebelow, said grid plate means including a plurality of individually cast independent refractory ceramic grid sections, each said section having a central manifold passageway and a plurality of outlet passageways extending from said manifold passageway to an upper surface of said grid section, a grid support comprising a mass of castable refractory substantially filling said bottom head space and having an upper surface in supporting surface contact with a lower surface of each of said sections forming said grid plate, means integrally joining a portion of the lower surface of each said grid plate means section with said grid support, means defining a plurality of pressure equilization passageways, between the lower surface of each said grid plate means section and the upper surface of said grid support, extending radially outward to the periphery of said grid plate means, whereby said pressure equalization passageways are in fluid communication with an upper surface of said grid plate, and a plurality of gas inlet conduit means extending upwardly through said grid support communicating with each said manifold passageway, whereby the gas pressure drop across the grid plate means required for bed fluidization is substantially eliminated and the lower surface of each said grid section comprising the grid plate means is substantially continuously supported across the reactor diameter.

6. The combination of claim 5 including at least one solids removal passageway extending upwardly through said grid support and terminating at the upper surface of said grid plate means.

7. A non-metallic gas distributor for a high temperature fluidized bed reactor comprising a generally circular refractory ceramic grid extending across substantially the entire width of a lower portion of the reactor to define a bottom head space therebelow and an upper fluidized bed zone thereabove, said grid including a plurality of spaced circular cross-section passageways communicating with a plurality of upwardly disposed fluidizing bed gas outlet passages, a grid support comprising a mass of castable refractory substantially filling said bottom head space and having an upper surface in supporting surface contact with a lower surface of said grid, means integrally joining a minor portion of the lower surface of said grid with said grid support, means defining a plurality of pressure equilization passages, between the lower surface of said grid and the upper surface of said grid support, extending outwardly to the periphery of said grid, whereby said pressure equalization passageways are in fluid communication with an upper surface of said grid plate, and gas inlet conduit means extending upwardly through said grid support in communication with said passageways, whereby the gas pressure drop across the grid required for bed fluidization is substantially eliminated and the lower surface of said grid is substantially continuously supported across the reactor diameter.

8. The combination of claim 7 wherein a major portion of the lower surface of said grid adjacent said grid support is free to move relative thereto under thermal stress.

* * * * *